US011292320B1

(12) United States Patent
Rice

(10) Patent No.: US 11,292,320 B1
(45) Date of Patent: Apr. 5, 2022

(54) VEHICLE WINDOW APPARATUS

(71) Applicant: Darin B. Rice, Pleasant Grove, CA (US)

(72) Inventor: Darin B. Rice, Pleasant Grove, CA (US)

( * ) Notice: Subject to any disclaimer, the term of this patent is extended or adjusted under 35 U.S.C. 154(b) by 39 days.

(21) Appl. No.: 16/861,005

(22) Filed: Apr. 28, 2020

(51) Int. Cl.
*B60J 1/00* (2006.01)
*B60J 1/20* (2006.01)

(52) U.S. Cl.
CPC .............. *B60J 1/007* (2013.01); *B60J 1/005* (2013.01); *B60J 1/006* (2013.01); *B60J 1/20* (2013.01)

(58) Field of Classification Search
CPC ... B60J 1/005; B60J 1/006; B60J 1/007; B60J 1/1085; B60J 1/10
USPC .................. 296/201, 146.15, 146.16
See application file for complete search history.

(56) References Cited

U.S. PATENT DOCUMENTS

| | | | | |
|---|---|---|---|---|
| 3,241,281 A | * | 3/1966 | Hall | B60J 10/70 52/204.597 |
| 4,646,492 A | * | 3/1987 | Fujikawa | B60J 1/10 296/84.1 |
| 4,757,854 A | * | 7/1988 | Rippberger | B44C 7/022 160/391 |
| 5,707,101 A | * | 1/1998 | Rice | B60J 1/1884 296/146.15 |
| 5,809,707 A | * | 9/1998 | Bargados | B60J 1/10 296/146.15 |
| 6,425,215 B2 | * | 7/2002 | Farrar | B60J 1/2094 296/146.15 |
| 7,000,251 B2 | * | 2/2006 | DeYoung | A61F 9/06 2/11 |
| 7,188,399 B2 | * | 3/2007 | Campus | B61D 25/00 29/428 |
| 2007/0056231 A1 | * | 3/2007 | DiMario | B60J 1/10 52/204.53 |
| 2018/0009300 A1 | * | 1/2018 | Forbes | B63B 19/00 |
| 2018/0229588 A1 | * | 8/2018 | Lewis | B60J 1/004 |
| 2020/0040641 A1 | * | 2/2020 | Eck | E06B 3/4618 |

FOREIGN PATENT DOCUMENTS

| | | | | | |
|---|---|---|---|---|---|
| DE | 4009348 A1 | * | 9/1991 | | B60J 1/007 |
| EP | 3241696 A1 | * | 11/2017 | | B60J 1/006 |
| GB | 2238568 A | * | 6/1991 | | B60J 1/10 |
| KR | 0113809 Y1 | * | 4/1998 | | |
| KR | 101347972 B1 | * | 1/2014 | | |
| WO | WO-2010028222 A2 | * | 3/2010 | | B60J 1/02 |

* cited by examiner

*Primary Examiner* — D Glenn Dayoan
*Assistant Examiner* — Kevin P Weldon
(74) *Attorney, Agent, or Firm* — Theodore J. Bielen, Jr.

(57) ABSTRACT

A vehicle window apparatus for a vehicle body utilizing a frame having an elongated channel that holds a glass sheet. The glass sheet includes a resilient cover which interacts with the groove of the elongated channel and is held in the groove by a clamp. A gasket and a resilient member form a moisture barrier on either side of the frame.

11 Claims, 5 Drawing Sheets

VEHICLE WINDOW APPARATUS

BACKGROUND OF THE INVENTION

The present application relates to a novel and useful vehicle window apparatus featuring a removable window which may be retrofitted to a vehicle.

Car customization has been used by many to change some portion of a car for an intended purpose. In certain cases, vehicle customization may be as simple as adding new wheels, installing a new radio, and the like. Further, extensive car customization may involve replacing an engine or large portions of the automobile body.

In the past, replacements for portions of the car have been devised. For example, U.S. Pat. No. 5,707,101 describes the installation of a modular window that is removable from a frame member once installed.

A vehicle window apparatus allows a replacement window to be installed and removed and yet be sealed against pernicious water intrusion would be a notable advance in the arts of vehicle replacements.

SUMMARY OF THE INVENTION

In accordance with the present application, a novel and useful vehicle window apparatus is hereinafter described.

The window apparatus of the present application utilizes a frame which is attached to a vehicle body by a connector such as an adhesive, screw, a mechanical fastening, and the like. The frame also is provided with a first surface and an opposite second surface.

An elongated channel is also included in the present application and is attached to the first surface of the frame. The channel includes a groove extending along the channel and, thus, along the frame member.

A transparent sheet, such as glass, plastic, or a similar item is also utilized in the present apparatus. The sheet is formed with a perimeter having an edge portion which is fitted with a resilient cover which overlies at least a portion of the edge portion. Preferably, the resilient cover overlies the entire edge portion of the transparent sheet perimeter. The edge portion of the transparent sheet and its resilient cover is also configured to fit within the groove of the elongated channel. Again, it is preferable that such fit be a snug fit to provide a watertight interaction between the resilient cover and the elongated channel.

At least one clamp, and preferably multiple clamps, are located on the frame first surface and is capable of removably engaging the edge portion of the transparent sheet. Thus, the transparent sheet is removably positioned relative to the elongated channel and, in essence, the frame.

A gasket, fixed to the frame, is also sealingly interposed the transparent sheet and the first surface of the frame. Thus, the resilient cover on the transparent sheet edge portion and the gasket sealingly interposed the transparent sheet and the first surface of the frame form a double barrier to prevent the intrusion of water between the transparent sheet and the frame.

In certain cases a guide may be positioned adjacent the groove of the elongated channel to bias movement of the transparent sheet and its edge portion having a resilient cover, into the groove of the elongated channel. The guide also serves as a moisture dam or trap in the groove of the elongated channel by interrupting the migration of any moisture therein. Such guide may take the form of a block having an inclined surface that biases the transparent sheet and the edge portion cover in sliding fashion.

At least one aperture is also formed through the frame to communicate the second surface of the frame with the channel located on the first surface of the frame. Specifically, such an aperture leads to the groove of the channel and permits any errant moisture to travel from the groove of the channel to the outer second surface of the frame when the apparatus of the present application is installed on a vehicle.

In addition, the present application further teaches the use of a resilient member affixed the outer, second surface of the frame, the resilient member interacts with an elastomeric strip and a camper shell to seal the same against water intrusion.

It may be apparent that a novel and useful vehicle window apparatus for a vehicle body has been hereinabove described.

It is therefore an object of the present application to provide a vehicle window apparatus that is easily installed on a vehicle body and includes a transparent member such as a window glass that may be removed therefrom as desired.

Another object of the present application is to provide a vehicle window apparatus for a vehicle body that utilizes a double gasket structure to prevent the intrusion of moisture into the vehicle when the vehicle window apparatus is installed on a vehicle body.

Another object of the present application is to provide a vehicle window apparatus for a vehicle body which is compatible with the installation of a camper shell on a vehicle.

A further object of the present application is to provide a vehicle window apparatus for a vehicle body which is adaptable for installation on virtually all vehicles, including passenger vehicles, utility vehicles, pickup trucks, and the like.

Another object of the present application is to provide a vehicle window apparatus for a vehicle body which is durable and includes a frame member which may be permanently installed on a vehicle body.

The invention possesses other objects and advantages especially as concerns particular characteristics and features thereof which will become apparent as the specification continues.

For a better understanding of the application, reference is made to the following detailed description of the preferred embodiments which should be taken in conjunction with the prior described drawings.

DETAILED DESCRIPTION OF THE PREFERRED EMBODIMENTS

Various aspects of the present application will evolve from the following detailed description of the preferred embodiments thereof which should be referenced to the prior delineated drawings.

Figure 1:
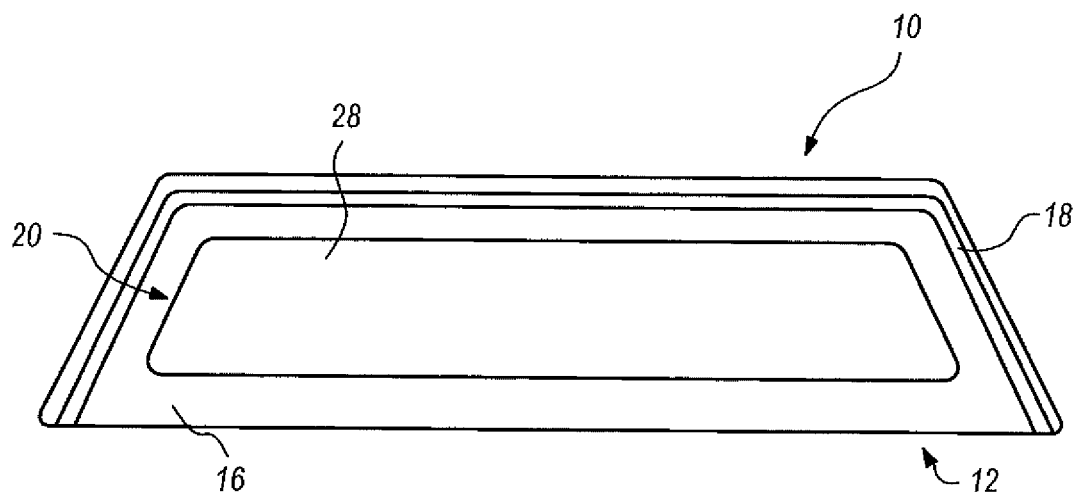
FIG. 1 is a rear exterior plan view of the apparatus of the present application.
Figure 2:
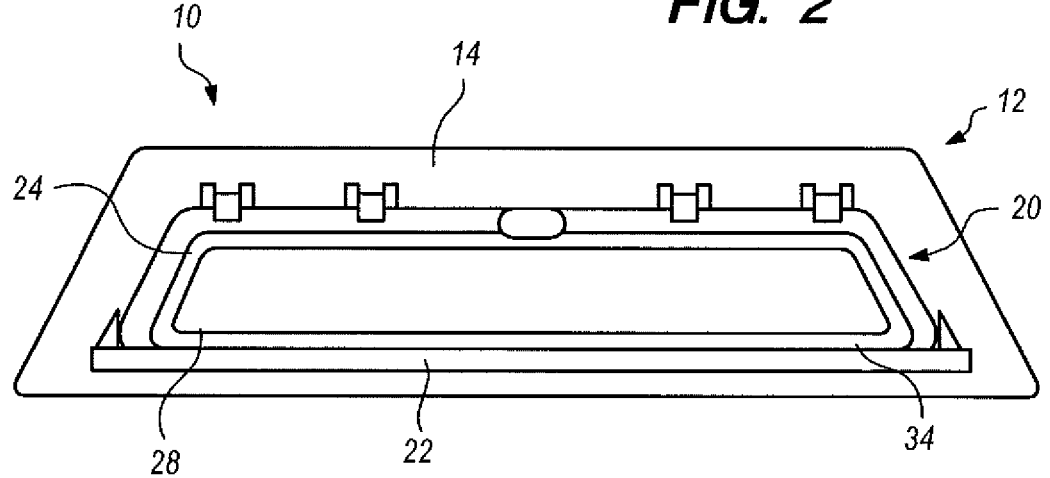
FIG. 2 is an interior plan view of the apparatus of the present application.

The apparatus as a whole is depicted in the drawings by reference character 10. Turning to FIGS. 1 and 2, it may be observed that apparatus 10 is formed with a frame 12. Frame 12 includes a first interior surface 14, FIG. 2, and a second opposite exterior surface 16. Again, with reference to FIG. 1, it may be seen that second opposite surface 16 includes an exterior resilient member 18 which is fastened thereto. Such interior and exterior denotation derives from the apparatus installation on FIG. 3 and specifically refers to interior and exterior of vehicle 26. Resilient member 18 will be further described in the present application as the specification continues.

Looking again at FIG. 2, it may be seen that a window unit 20 has been clamped to first surface 14. In addition, first surface 14 is provided with an elongated channel 22. Moreover, first surface 14 of frame 12 is fashioned with a gasket 24 which extends completely around the inner perimeter of frame 12, and which will be further described in detail as the specification continues.

Figure 3:
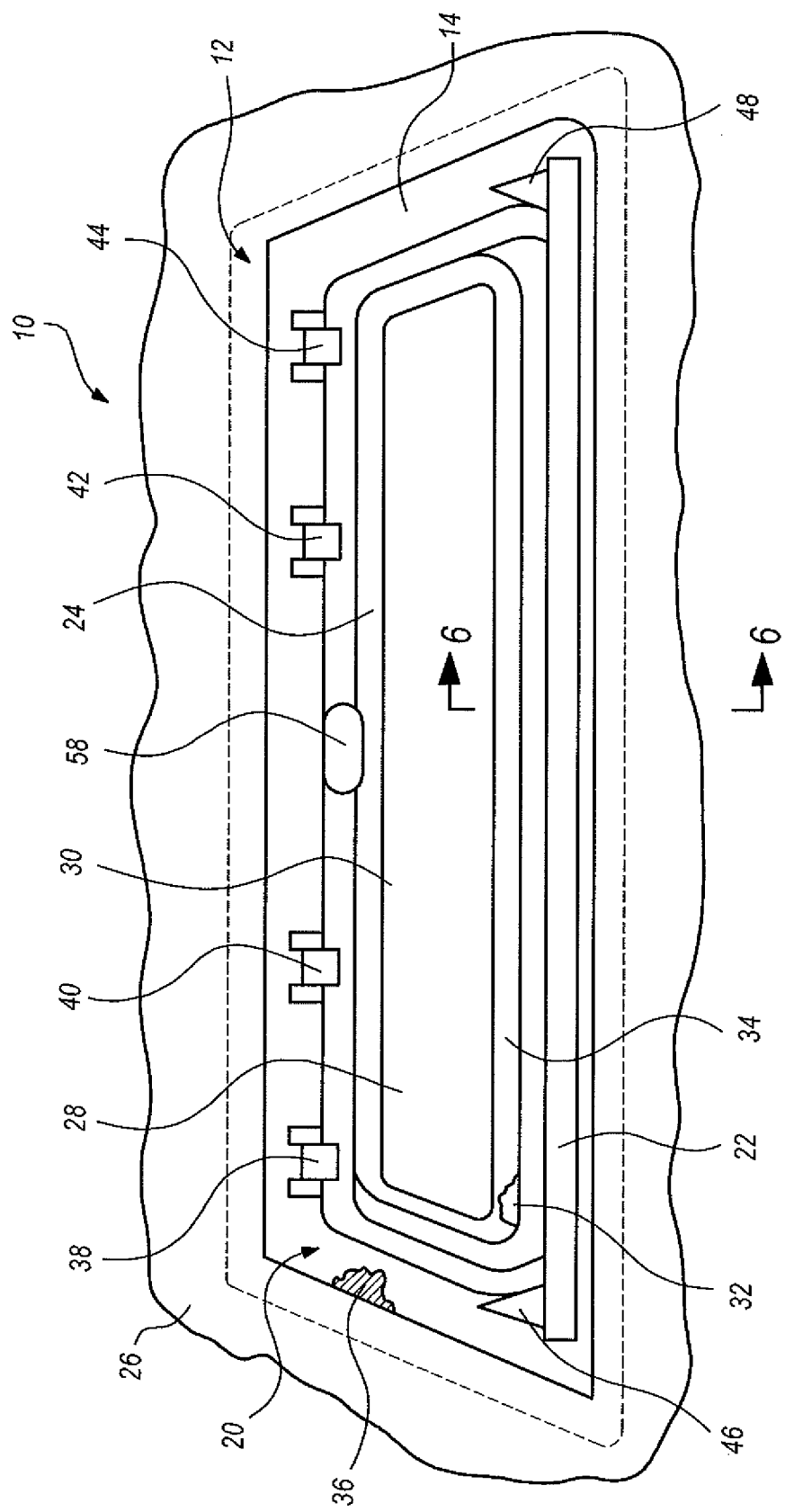
FIG. 3 is an interior plan view of the apparatus of the present application installed on a vehicle body.

With reference to FIG. 3, it may be apparent that frame 12 has been affixed to a vehicle body 26 and which may be accomplished by the use of any suitable adhesive 36 or fasteners. For example, a urethane adhesive will suffice in this regard.

With further reference to FIGS. 1-3, apparatus 10 also includes as one of its elements a transparent sheet 28, which may be formed of glass, plastic, or any other suitable material. Transparent sheet 28 includes a perimeter 30 which may take the form of a rubberized material. In addition, apparatus 10 is formed with clamps 38, 40, 42, and 44. Clamps 38, 40, 42, and 44 are mounted to frame 12 and are capable of removably engaging edge portion 32 of transparent sheet 28 as well as resilient cover 34. The specific structure of any of such clamps will be detailed hereinafter.

Figure 4:
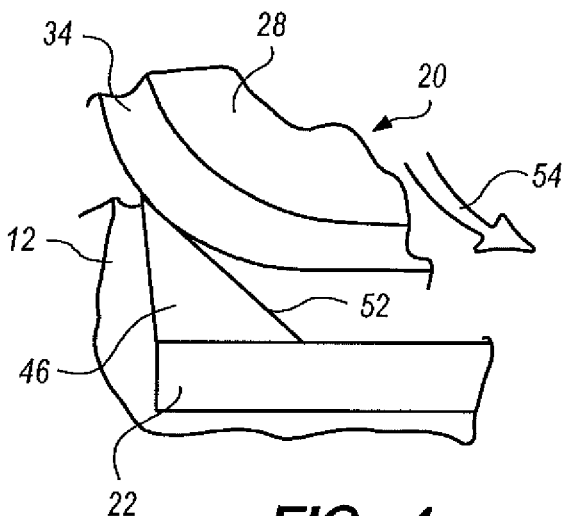
FIG. 4 is a partial side elevational view of a transparent sheet having a resilient cover represented in its initial contact with the guide mechanism of the present application.
Figure 5:
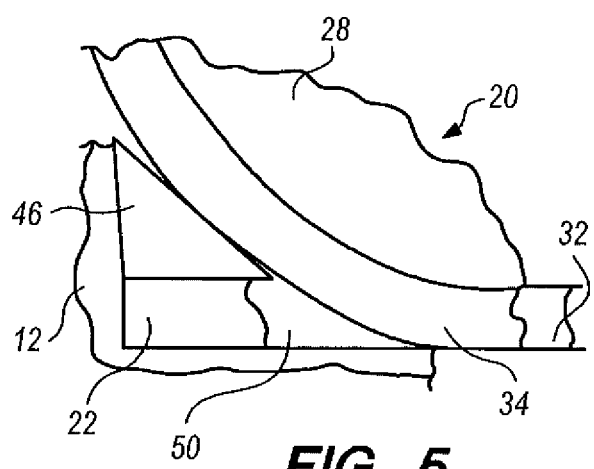
FIG. 5 is a partial side view of a transparent sheet having a resilient cover having been guided into the groove of the channel fixed to the frame member of the apparatus of the present application.

Window unit 20 is intended to be installed relative to frame 12 and removable therefrom. In this regard, guides 46 and 48, FIGS. 3-5 aid in the positioning of window unit 20 within channel 22 that possesses a groove 50. That is to say, window unit 20 will slide down inclines surface 52 of guide 46, and a similar incline surface of guide 48, to enter groove 50, as shown in FIGS. 4 and 5. Such movement is indicated by directional arrow 54 on FIG. 4. Guides 46 and 48 also serve as a dam for moisture having entered groove 50 of channel 22.

Figure 6:
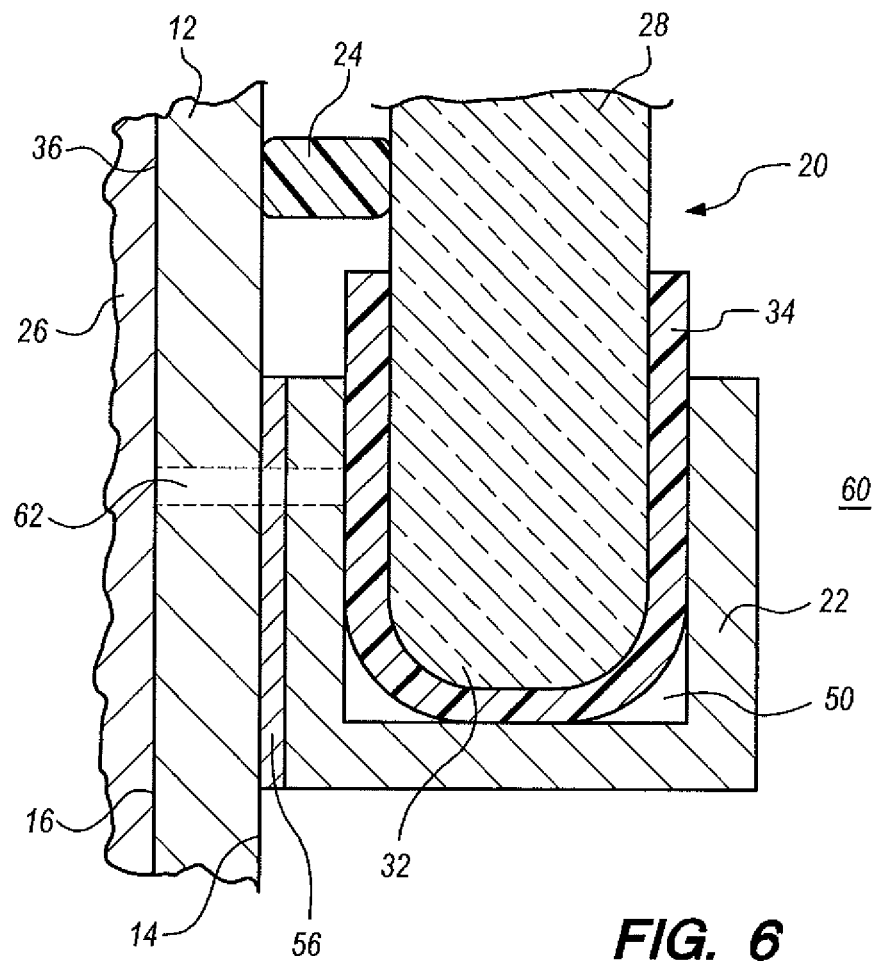
FIG. 6 is a sectional view taken along line 6-6 of FIG. 3.

Turning to FIG. 6, the installation of window unit 20 relative to frame 12 is provided in further detail. Frame 12, being fixed to vehicle body 26 by adhesive 36, supports a gasket 24 which extends around first surface 14 of frame 12 as heretofore described. Window unit 20, including transparent sheet 28, fits within groove 50 of channel 22 which is also affixed to frame 12 first surface 14 via a spacer or fastener 56, which may take the form of a double sided adhesive tape. Grip 58, FIG. 3, aids the user in the manual manipulation of window unit 20 for the installation of the same relative to frame 12. Again, with reference to FIGS. 4-6, it should also be apparent that when window unit 20 is installed relative to frame 12, resilient cover 34 about edge portion 32 of transparent sheet 28, as well as gasket 24, provides a double watertight seal between the exterior of vehicle 26 and the inside of the vehicle 60. However, should any moisture or water enter groove 50 of panel 22 and be trapped by guides 46 and 48, one or more apertures or weep holes are provided. Exemplar weep hole 62, may be fashioned as an aperture through frame 12 and channel 22 to allow moisture to escape to the exterior of vehicle 26. In other words, aperture 62 communicates with groove 50 and the exterior of vehicle 26.

Figure 7:
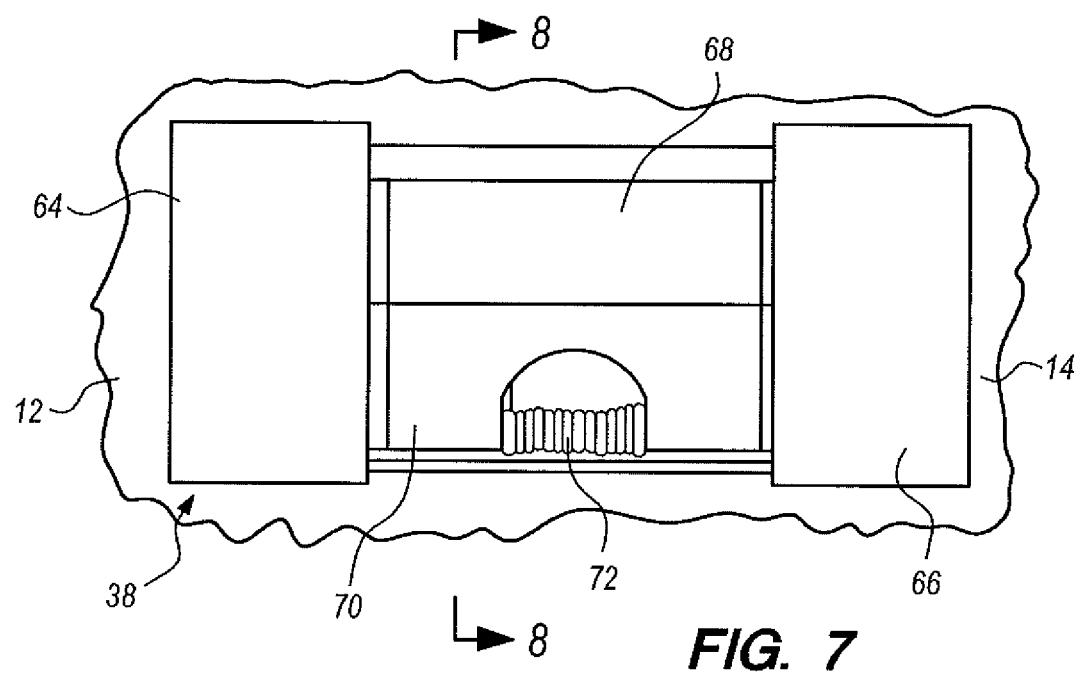
FIG. 7 is a top plan view of a typical clamp fixed to the frame of apparatus of the present application.
Figure 8:
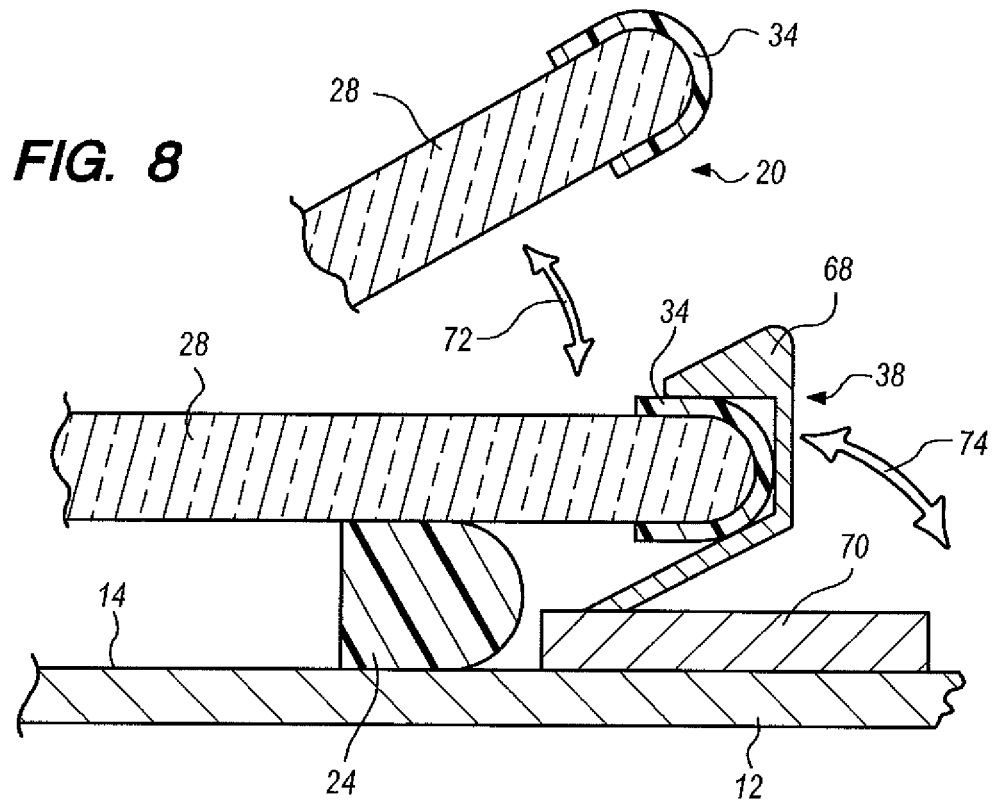
FIG. 8 is a side elevational view of the clamp of FIG. 7 with a partial rendition of the transparent sheet being held thereto and being released therefrom.

After placement of window unit 20 within channel 22 and groove 50, clamps 38, 40, 42, and 44 are closed on window unit 20. With reference to FIGS. 7 and 8, it may be observed that exemplar clamp 38 is shown in detail and includes base members 64 and 66, which are fixed to frame 12 by any suitable connection means. Jaw 68 connects to a platform 70 which houses a biasing spring 72. Thus, jaw 68 is rotatable relative to platform 70 and is capable of holding transparent sheet and resilient cover 34 in place against gasket 24 outwardly from first surface 14 thereof. Directional arrow 72, FIG. 8, indicates the placement of window unit 20 toward and away from clamp 38. Directional arrow 74 shows the rotational movement of jaw 68 of clamp 38. Needless to say, clamps 40, 42, and 44 operate in a similar manner as claim 38.

Figure 9:
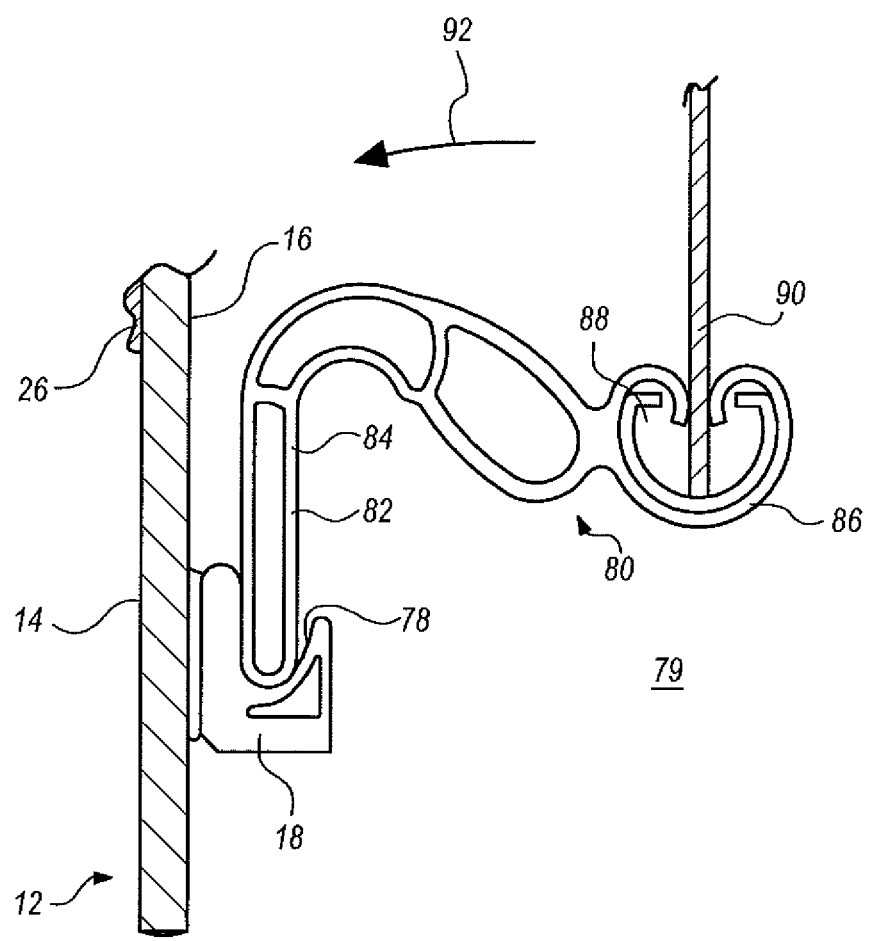
FIG. 9 is a side elevational view of a gasket affixed to the exterior surface of the frame and interacting with the resilient strip holder for a camper shell, partially depicted therein.

FIG. 9 shows a resilient member 18 that is affixed to second surface 16 of frame 12 and lies on the outside 79 of vehicle body 26. Resilient member 18 is formed with a crevice 78. An elongated elastomeric strip, or boot 80, includes a tongue 82 on one end 84 thereof. Another end 86 of boot 80 possesses a mouth 88 which is capable of accepting a structure 90 which may be a portion of a camper shell used in conjunction with vehicle 26. Directional arrow 92 indicates the folding movement of elastomeric strip 8 toward second surface 16 of frame 12 to again create a watertight seal between camper shell 90 and frame 12.

In operation, the user would remove the preexisting window from vehicle 26 to create an opening. At this point, frame 12 is attached to vehicle 26 by the use of adhesive 36 on first surface 14, or by the use of a mechanical fastener. Once in place, window unit 20 may be removably fixed to frame 12 by placing window unit 20 within groove 50 of channel 22 which is also affixed to first surface 14 of frame 12. Such a maneuver is illustrated in detail with FIGS. 4-6. That is to say, guides 46 and 48 allow the slipping or sliding of window unit into groove 50 of channel 22 such that a watertight seal is created. At the same time, gasket 24 rests against transparent sheet 28. Such contact is reinforced when clamps 38, 40, 42, and 44 engage the remaining portion of window unit 20 in the removable fastening of window unit 20 to frame 12. The latter operation is illustrated by FIGS. 7 and 8. In addition, the second side 16 of frame 12 would include resilient member 18 having a crevice 78. A boot or elastomeric strip 80 is then employed such that the tongue portion 82 on one end 84 of boot 80 fits within crevice 78. The opposite end 86 of boot 80 includes a mouth 80 which engages a structure 90 such as a portion of a camper shell. Once this occurs, camper shell 90 is pushed toward frame 12 according to directional arrow 92 of FIG. 9. Thus, another seal takes place on second side 16 of frame 12 to provide a watertight seal between frame 12 and camper shell 90. Any moisture that enters groove 50 of channel 22, and is trapped therein by guides 46 and 48, exits weep holes, such as weep hole 62, communicating with groove 50 and channel 22.

While in the foregoing embodiments of the application have been set forth in considerable detail for the purposes of making a complete disclosure of the application it may be apparent to those of skill in the art that numerous changes may be made in such details without departing from the spirit and principles of the application.

What is claimed is:

1. A vehicle window apparatus for a vehicle body, comprising:
   a frame, said frame comprising a first surface and an opposite second surface;
   an elongated channel, said elongated channel being attached to said first surface of said frame, said elongated channel possessing a groove;
   a transparent sheet, said transparent sheet comprising a perimeter having an edge portion and a resilient cover overlying at least a portion of said edge portion of said transparent sheet perimeter;
   said edge portion of said transparent sheet and said resilient cover being configured to fit with said groove of said elongate channel;
   at least one clamp, said at least one clamp being located on said frame first surface and being capable of removably engaging said edge portion of said transparent sheet and said resilient cover and removably positioning said transparent sheet in said groove of said channel;
   a gasket, said gasket sealingly interposed between said transparent sheet and said first surface of said frame; and
   a resilient member attached to said opposite second surface of said frame, said resilient member including a crevice and an elongated elastomeric strip, said elongated elastomeric strip including a tongue on one end fitting within said crevice of said resilient member and a mouth on another end, said mouth configured to hold a structure; and
   a connector for fixing said frame to the vehicle body.

2. The apparatus of claim 1 which additionally comprises a guide, said guide comprising an inclined surface for biasing said transparent sheet and said edge portion cover into said groove of said channel.

3. The apparatus of claim 2 which additionally comprises another of said at least one clamp located on said frame first surface, said another clamp being capable of removably engaging said edge portion of said transparent sheet and said resilient cover, and removably positioning said transparent sheet in said groove of said channel.

4. The apparatus of claim 1 in which said connector for fixing said frame to the vehicle body comprises an adhesive.

5. The apparatus of claim 1 which additionally comprises another of said at least one clamp located on said frame first surface, said another clamp being capable of removably engaging said edge portion of said transparent sheet and said resilient cover, and removably positioning said transparent sheet in said groove of said channel.

6. The apparatus of claim 1 which further comprises an aperture through said frame and said channel for communication with said groove of said channel.

7. The apparatus of claim 6 which additionally comprises a guide, said guide comprising an inclined surface for biasing said transparent sheet and said edge portion cover into said groove of said channel.

8. The apparatus of claim 7 which additionally comprises another of said at least one clamp located on said frame first surface, said another clamp being capable of removably engaging said edge portion of said transparent sheet and said resilient cover, and removably positioning said transparent sheet in said groove of said channel.

9. The apparatus of claim 8 in which said connector for fixing said frame to the vehicle body comprises an adhesive.

10. The apparatus of claim 2 in which said guide further comprises a dam portion for interrupting moisture migration in said groove of said channel.

11. The apparatus of claim 7 in which said guide further comprises a dam portion for interrupting moisture migration in said groove of said channel.

\* \* \* \* \*